United States Patent [19]

Krewson et al.

[11] 3,820,069

[45] June 25, 1974

[54] ELECTRO-OPTICAL READ SYSTEM

[75] Inventors: Neil N. Krewson; John B. Tait, Vestal, both of N.Y.

[73] Assignee: International Business Machines Corporation, Armonk, N.Y.

[22] Filed: Dec. 26, 1972

[21] Appl. No.: 318,075

[52] U.S. Cl. .................... 340/146.3 H, 340/146.3 F

[51] Int. Cl. .............................................. G06k 9/04

[58] Field of Search ............ 340/146.3 H, 146.3 SY, 340/146.3 F, 324 R, 324 A, 378 R, 378 A, 378 B; 250/219 CR, 219 DR, 220 M, 227; 178/18, 19

[56] References Cited

UNITED STATES PATENTS

| | | | |
|---|---|---|---|
| 3,177,470 | 4/1965 | Galopin | 340/146.3 F |
| 3,305,689 | 2/1967 | Leavy, Jr. et al. | 250/227 |
| 3,394,366 | 7/1968 | Dye | 178/18 X |
| 3,432,675 | 3/1969 | Roby | 250/227 |
| 3,549,895 | 12/1970 | Sidorsky | 250/227 |

*Primary Examiner*—Paul J. Henon
*Assistant Examiner*—Leo H. Boudreau
*Attorney, Agent, or Firm*—Charles S. Neave

[57] ABSTRACT

An electro-optical read system utilizing a position generating tablet, a handheld sensing device for reading the data from a source document and employing a fiber optic bundle to transmit the data representing signals to an associated unit that contains the data buffers, data recognition and logic circuitry, power supplies, and other related equipment. The read operations can be performed in a random manner without requiring a scan to be performed in any prescribed or predetermined sequence.

12 Claims, 6 Drawing Figures

ELECTRO-OPTICAL READ SYSTEM

BACKGROUND OF THE INVENTIRN

1. Field of the Invention

This invention relates to an electrooptical read system, and more particularly to apparatus for reading source documents and data records.

2. Description of the Prior Art

Typical prior art electro-optical signal converter systems are exemplified, for example, by U.S. Pat. No. 3,305,689. In this type of system, means are provided for visually selecting and indicating any one of a plurality of certain simple display areas on the screen of a cathode ray tube. The apparatus detects or "captures" only radiant energy pulses of predetermined characteristics, appearing within the selected and indicated display area, and is non-responsive to radiant energy of other energy characteristics, or which occurs outside of the area. The detected radiant energy pulse is converted to an electrical signal which is time-coincident with such detected radiant pulse. Supervisory means are included for indicating proper operation of the mechanism.

U.S. Pat. No. 3,651,509 discloses a light pen arrangement for display systems having inherent memory which operates in conjunction with display scanning signals for writing or erasing information on the display, such as for interactive graphics applications. The scanning signals generate momentary light pulses on the display which are detected by the light pen arrangement and used to selectively produce conventional write or erase signals as the light pen is manipulated adjacent to the display.

U.S. Pat. No. 3,182,291 relates to a writing utensil which recognizes a symbol as it is being written therewith, and converts it into electric pulses that permit recognition of the symbol and immediate conversion of the pulses into the same symbol at points remote from the location of the writing.

U.S. Pat. No. 3,412,255 discloses a fiber-optic character reader used to decode an optical image into a binary form before any conversion from light energy to electrical energy.

SUMMARY OF THE INVENTION

The electro-optical read system of the present invention overcomes disadvantages and shortcomings of prior known constructions and includes features and advantages of providing a good method of direct data input for a data processing system utilizing optical apparatus for performing the reading operations.

Briefly, the electro-optical read system comprises a hand or manually held sensing device that is utilized for reading information by optical means through the use of a light source and light sensitive areas arranged on the front surface of the sensing device. The source of light and information read is conducted by light fiber pipes to a unit which contains data buffers, the recognition and logic circuitry, power supplies, and other related equipment. The system works in combination with a data mapper or position generating tablet which provides locator signals to the sensing device when it is in proper proximity to perform a read operation. Additionally, the same mapper tablet provides positional information of an "X" – "Y" nature so that the characters can be read from any position on the source document and can be optionally controlled by the system or an operator. The system, by sensing the locator signals that are radiated by the data position generating tablet, is able to provide a timed reference signal which indicates to the system how well the sensing device is positioned over a character or how well it is receiving the reference signals through the sensing media. This allows automatic notification to the user to rescan an area if the system requests it due to failure to correctly read a particular character in a field. The selection and read operations can be completely random.

It is a primary object of the invention to provide a system for reading indicia from source documents and the like which is easily scanned by an operator and does not restrict speed or throughput of data to a central processing system.

It is another object of the invention to provide a reading system which is completely random.

Another object of the invention is to provide a scanning system that automatically compensates for misorientation or misalignment with respect to the indicia to be read from a source document thereby providing substantially error free operation.

The foregoing and other objects, features and advantages of the invention will be apparent from the following, more particular description of the preferred embodiments of the invention, as illustrated in the accompanying drawings.

FIGS. *3a*, *3b*, and *3c* are illustrative of character positioning and misalignments within reading capability of the present invention.

Figure 4:
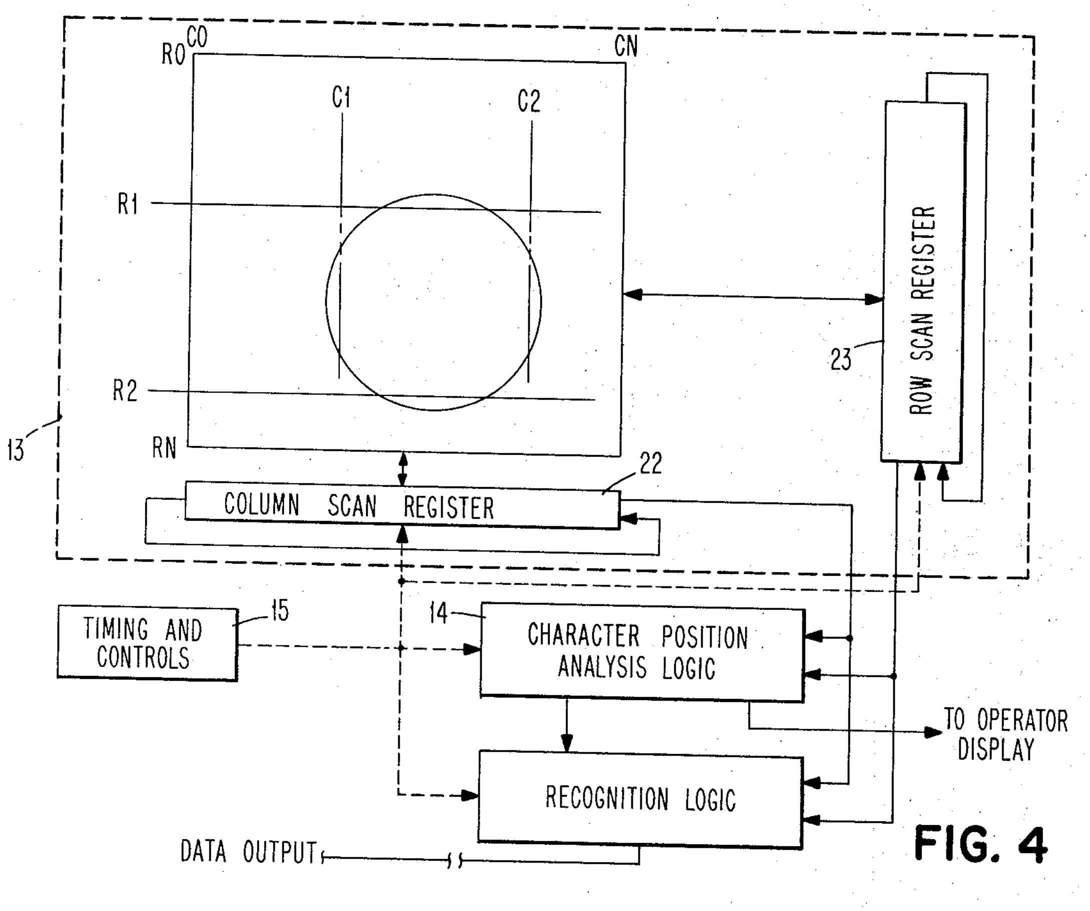

FIG. 4 is a schematic diagram of the light sensitive character buffer in association with other timing, control, and storage logic apparatus.

DESCRIPTION OF THE PREFERRED EMBODIMENTS

Figure 1:
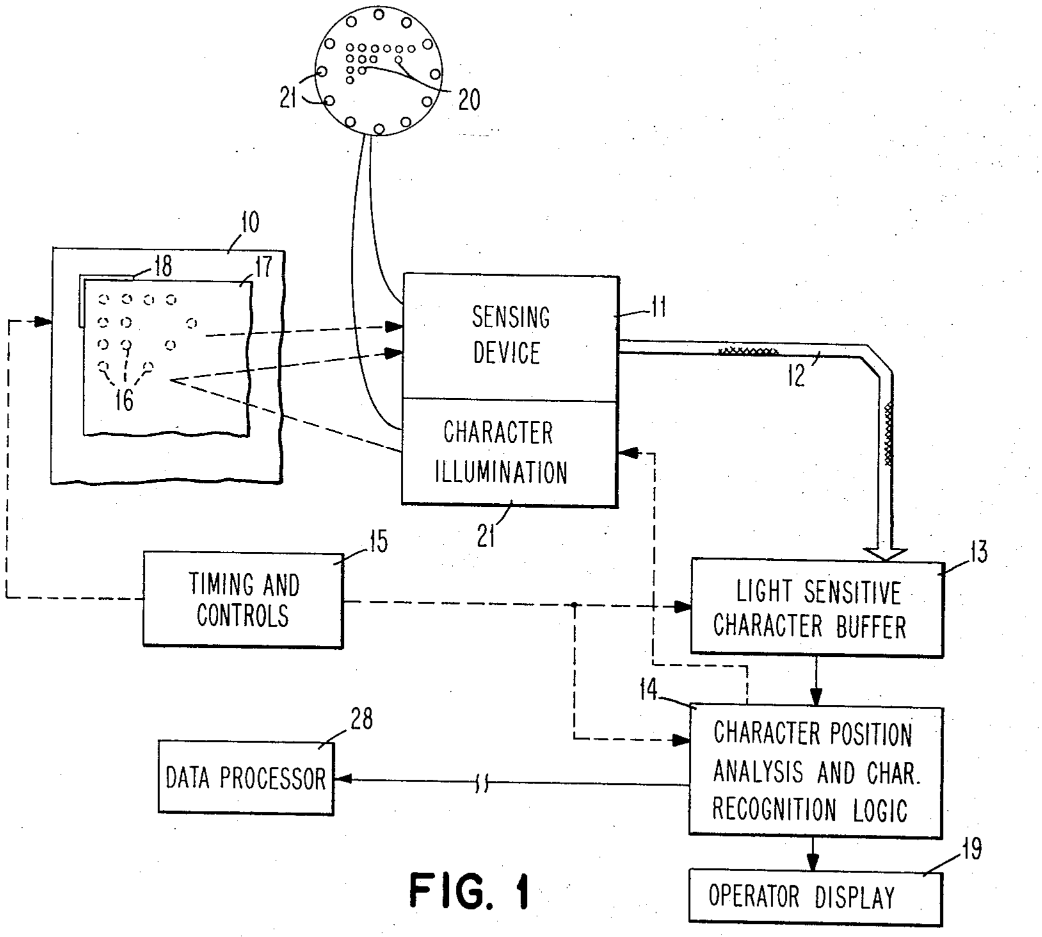
FIG. 1 is a schematic diagram of an electro-optical read apparatus in accordance with the principles of the invention.

In FIG. 1, there is a showing of an electro-optical read apparatus comprising a tablet 10, a read sensing device 11, a fiber optic cable 12, a character buffer 13, character position analysis and recognition logic 14, and timing controls 15.

In accordance with one embodiment of the invention, the tablet 10 includes a mapper matrix comprising horizontal and vertical rows of energy sources 16. In one form, electromagnetic radiation at infrared frequencies from coherent light emitting diodes 16 may be used to penetrate a paper source document 17 or the like when placed on the tablet 10 surface. A paper document 17 to be read would be placed on the tablet 10 surface and oriented by means of the adjustable corner guide 18 at the upper left-hand area of the tablet 10. A scan operation would be effected by controls 15 wherein the light emitting sources 16 are scanned horizontally from left to right and vertically from top to bottom row-by-row to produce a raster type scan. Identification of every character position is provided by its time of occurrence in the raster scan. Accordingly, there is a discrete address for every position and enables random read operations to be performed. For example, a scan rate of 400 K hertz would enable a scan of 4,000 positions on an 8½ inches × 11 inches sized document 100 times in one second. Other scanning rates are well within the capabilities of the system. Additional details of the read operations will be presented later in the description.

Figure 2:
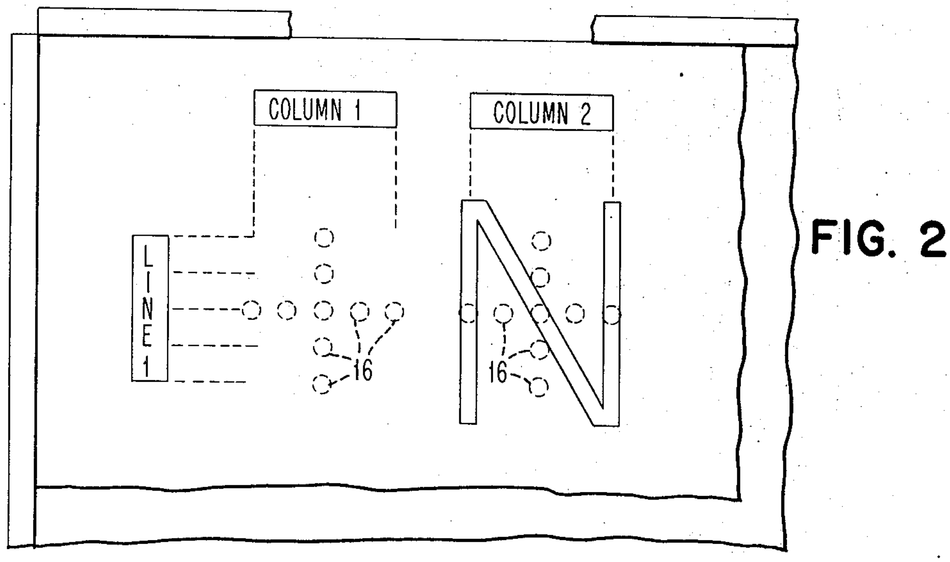
FIG. 2 is a fragmentary showing of a tablet device showing character position and reading arrangement according to the present invention.

The tablet 10 comprises a planar surface having an X/Y array of locator signal emitting diodes 16. As shown in FIG. 2, infra-red coherent light emitting diodes 16 (LED) are used to provide a locator signal which will penetrate a paper document 17 placed on the tablet 10, from the backside through the paper document 17 to the front surface of the paper. In accordance with a preferred embodiment, each locator signal position comprises a cross array (+) wherein each character column is selected by driving a desired group of LED's 16 at the selected column and row spacing. Alternatively, the locator signal could be constructed of a simple single LED 16, or a source having a suitable mask to provide a planar position sensitive target form. The locator signals are generated in a cyclical manner and scanned sequentially. The locator source is energized at electronic speeds to effectively strobe any movement of a sensing instrument 11 to a stop. The locator signals provide a tablet 10 surface X/Y address signal in that they begin at time zero and scan in a predetermined manner across each row and column in order and at a high repetition rate of speed. For example, in one arrangement, the target generated by the locator signal generators is in the form of a + mark which is centered with each column and row of data characters to be read. The tablet 10 also includes a corner guide 18 located in the upper left-hand corner which facilitates adjustment and alignment of a document that is placed on the tablet for reading. The adjustment corner guide 18 provides a means to align the printed characters of the input document with target signals that are radiated through the document 17 by locator signal generators. The vertical portion of the cross (+) is aligned with the vertical axis of the tablet 10 to provide a position reference signal. The purpose of the cross (+) signal is to provide information of an analytical nature of the data read by the character sensing device 11. The cross (+) allows information to be derived on whether the character sensing device 11 is rotated about an axis perpendicular to the tablet 10 surface, or is misaligned vertically, horizontally, or diagonally with any particular character position in a column or row. The locator signals provide information to the analyzer section of the read and character recognition logic 14 to preset the reference points in that logic to compensate on a character-by-character basis for any misalignments.

The read sensing device 11 comprises an array of fiber optic light conductors 20 within the cable 12 and with suitable input and output combinations. The peripheral area of the light conductor bundle is used as a light source 21 to bring light from a light generator to the surface of the paper document 17 being read. The center portion of the sensing device is a coherent light conductor bundle that functions to conduct the reflected light pattern from the paper document 17 being read back to the character buffer 13, the character position analyzing logic and recognition logic 14 circuitry. The sensing device 11 is constructed with a window like aperture comprising a coherent bundle of signal responsive devices that is generally larger than the area of the largest character to be read in order to allow for horizontal, vertical, diagonal and rotational misalignment of the sensing device 11 as it is moved across the paper document 17 by hand. If the sensing device is made large enough to cover more than one character or line of characters, the read operation selects the desired character by utilizing the discrete address of the character that is in an acceptable position to be read and then reading it in timed sequence.

Figure 3A:
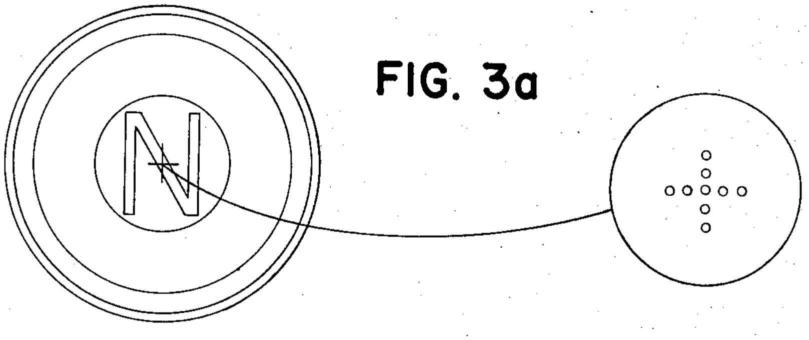
Figures 3B, 3C:
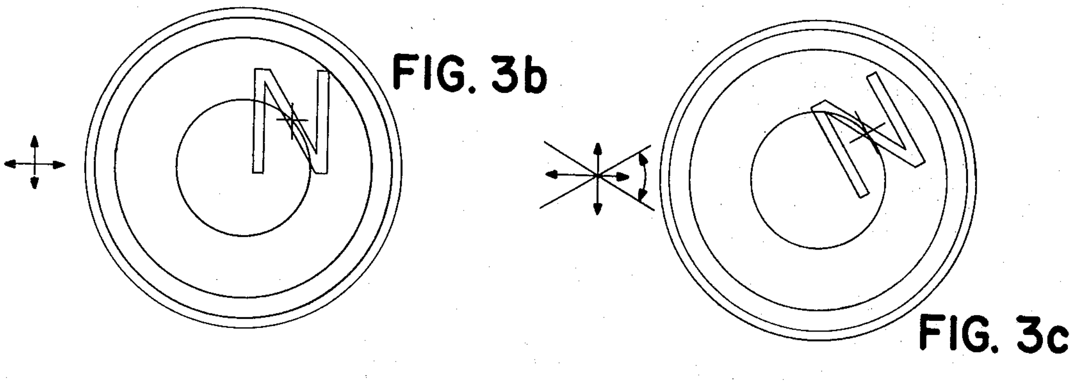

The read operation comprises a timed reference cycle with current applied to selected LEDs 16 (Light Emitting Diodes) in accordance with character and line spacing of the input document 17 thereby producing a positive reference or locator signal which penetrates the paper and is detected by the sensing device 11. Variable formats of document reading can be accommodated by the programming of the controls 15. A proper detection of the locator signal is followed by a scan cycle wherein light from character illumination means 21 associated with the sensing device 11 is applied to the document surface with a subsequent reading of the reflected character image from the document 17 back through the character buffer 13 and to the recognition logic 14. These subcycles in the scan arrangement are operated at a speed high enough to provide a number of "reference light source on" and "reflected read subcycles" to be completed at each character position to insure a reliable reading. In the instance of a misaligned sensing device 11 position as it passes over a character, a reference cross (+) will be detected in the aperture of the sensing device 11 and in the recognition logic 14 equipment which will be displaced from its normal centered position vertically, laterally, and rotationally, as needed. This moving reference cross (+) signal permits the attached hardware and logic to determine if the character that is to be read is within the sensing area aperture and thereby enables a proper compensating of adjustments in the reading and recognition of the character. For example, FIG. **3*a* shows the character N centered and aligned within the sensing area. However, if the character N (FIG. 3*b*) is displaced to the right and higher than the centered line at the position where it should be read, the reference cross (+) will also appear in the same relative position. FIG. 3*c* shows the combination of character misalignment which is high, to the right of center, and a counterclockwise rotation. Detection of such a reference cross (+) signal allows the position analyzing circuitry to effectively move the character to the left, down, and rotationally to recenter it and enable recognition of the character as an N with a minimum of exposure to error. The detected cross (+) by its position as developed in the light sensitive buffer 13 and character position analysis logic 14 provides the X/Y and/or rotational displacement through analysis of the bit values derived. This is more fully described later in the description. The derived error signals also provide threshold information which allows the control circuitry to determine if a period or position of unreliable reading is occurring and in this event to make suitable corrections or to signal the operator via the operator display 19 to rescan a particular portion of the document. The operator can be instructed to rotate the sensing device 11** to the right, left, or move the device up or down as a result of the specific character-by-character reference signal analysis. This real time closed loop system provides an interactive means for insuring that the sensing device 11 is placed in an optimum position to permit the reading of the document paper 17.

The system logic (FIG. 4) end of the fiber optical bundle 12 is decoded by a series of photosensors in the light sensitive character buffer 13 which may be of a storage type or the storage sensors may be backed up by a suitable array of storage elements. The storage elements within the character buffer 13 for each of the fiber conductors within cable 12 is addressable by means of the scan registers 22 and 23 and has a logical relationship for the subsequent analysis. The X/Y position of each bundle is assigned a value for addressing purposes and this enables the analyzing circuitry 14 for sensing device 11 position and the character recognition logic to know what values are placed in each individual cell position of the storage array and make the proper analysis of the character on a bit-by-bit basis.

The character buffer 13 has a raster array of light sensitive devices capable of being loaded in parallel from the sensing device 11 and read out in sequence of a raster type scan. In FIG. 4 the buffer is shown with positions for columns $Co$ to $Cn$ and rows Ro to $Rn$. These positions provide the temporary storage and digitizing of the characters as input from the sensing device 11. The "illuminate-sense" sub-cycle is repeated at electronic speeds at each character position and the reference signal is used to determine when the character is enabled to be read. The area labeled $C_1$ $C_2$ $R_1$ $R_2$ in FIG. 4 shows the acceptance area for the reference cross.

The column and row scan registers 22 and 23 read out the character buffer 13 contents to the position analysis circuitry after the reference cross has been pulsed at the position being read. The center of the cross is located by the analysis circuitry through examination of the row, column scans. If no rotation is present, the buffer and analysis circuitry will produce a 5 bit row and 5 bit column cross (+) signal only at the center location or address of the reference cross (FIG. 3$a$). The position analysis circuitry determines if the address found is within the limits $C_1$ $C_2$ $R_1$ $R_2$ to allow the character to be illuminated and read into the buffer.

If rotation is present on the reference cross (+) signal stored in the buffer, the values scanned out of the column and rows tell the amount of rotation. If no rotation is present, the vertical bit sums are 11511 for the column and the horizontal bit sums are 11511 for the row with the center at the location of the coincidence 5's in row-column position. These values approach a 22122 value (FIG. 3$c$) as the rotation equals 45°. The number of discrete values between is determined by the number of bits in the reference cross and the related buffer light sensitive positions. These derived left, right, up, down and rotation position signals provide the reference value for use by the character sensing system to improve the read capability. The amount and direction of the character displacement is supplied to the character sensing logic circuits before the character is presented for recognition. When the position displacement signals exceed the threshold of the reliable reading condition, they are used to generate the appropriate message to the operator by means of the operator display 19.

The utilization of the light sensing device 11 with a discretely adressed reference tablet 10 allows the sensing device 11 to start and stop in any position of qand trred in tee diget enitive kuffer 13 can ke transferred to utilization means such as a data processor 28.

The utilization of the light sensing device 11 with a discretely addressed reference tablet 10 allows the sensing device 11 to start and stop in any position of travel and in any direction. Since the address of every character position on the tablet is discrete, the locations of data to be accepted for a particular document to be read in is known and/or can be programmed. This allows checking of the system to insure that the proper data is obtained from the source document. Since each position is read discretely, the order of reading is not essential to the function so that the sensing device can be read, used in a read cycle from right to left or left to right, from top to bottom or bottom to top, or even diagonally, as long as the aperture crosses the characters to be read within acceptable limits of the position analysis logic circuitry. The read operation is analogous to a series of high speed snap shots taken when the reference cross (+) detected by the sensing device 11 is within a safe reading area within the aperture of the sensing device 11.

The data read from a source document 17 and stored in the light sensitive buffer 13 can be transferred to utilization means such as a data processor 28.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electro-optical system for random reading of a source document, the system combination comprising:

a. a position generating tablet including means adapted to produce electromagnetic locator signals at infrared frequencies which are representative of discrete character positions on the source document, b. a sensing device responsive to said electromagnetic locator signals and including character illumination means, c. a light sensitive character buffer coupled with said sensing device and responsive to signals from said sensing device, and d. a character position analysis and recognition logic device coupled with the light sensitive character buffer and responsive to electromagnetic locator signals therefrom for generating logic control signals and energizing said character illumination means and thereby initiating character reading operations, whereby reflected light signals representing data from the source document are sensed by the sensing device for transmission sequentially to the light sensitive character buffer and then the character position analysis and recognition logic device.

2. An electro-optical document reading system as defined in claim 1 further including a timing means coupled to the position generating tablet, the light sensitive character buffer, and the character position analysis and recognition logic device for controlling the timing of the character position electromagnetic locator signals and sensing signals.

3. An electro-optical document reading system as defined in claim 2 further including an operator display, said character position analysis and recognition logic device being coupled with said display and responsive to the locator signal to provide position indicating signals on the display for viewing by an operator to indicate orientation of the sensing device relative to the data being sensed.

4. An electro-optical source document for a random character reading system comprising:

a. a position generating tablet including means adapted to produce electromagnetic locator signals at infrared frequencies which are representative of discrete character positions on the source document, b. a sensing device responsive to said electromagnetic locator signals, c. a light sensitive character buffer coupled with said sensing device and responsive to signals from the sensing device, d. a character position analysis device coupled with the light sensitive character buffer and responsive to character position electromagnetic locator signals therefrom for generating logic control signals and initiating character reading operations, e. character illumination means associated with said sensing device and responsive to a signal from the character position analysis device initiating character reading operations whereby reflected data representing light signals are generated from the source document for sensing by the sensing device, and f. a character recognition logic device coupled with said light sensitive character buffer and responsive to data representing signals transmitted by said sensing device through said light sensitive character buffer for producing data representing signals adapted for transmission to other utilization means.

5. An electro-optical source document reading system as defined in claim 4 wherein said position generating tablet is further characterized as including an array of coherent light emitting diodes for generating the electromagnetic character position locator signals.

6. An electro-optical source document reading system as defined in claim 4 wherein the coupling of the light sensitive character buffer with the said sensing means is accomplished by means of a cable having an array of fiber optic light conductors.

7. An electro-optical source document reading system as defined in claim 4 wherein the sensing device includes a coherent bundle of signal responsive elements covering an area larger than that of the largest character to be read.

8. An electro-optical source document reading system as defined in claim 7 wherein the character illumination means associated with the sensing device are mounted peripherally about said signal responsive elements.

9. An electro-optical source document reading system as defined in claim 8 wherein said character position analysis device further includes character misalignment compensation means.

10. An electro-optical source document reading system as defined in claim 9 wherein said character misalignment compensation means includes compensating capability for vertical, horizontal, diagonal, or rotational character misalignments.

11. An electro-optical system for reading a source document, the system comprising:

a. a position generating tablet including document aligning means and an array of coherent light emitting diodes adapted to produce electromagnetic signals which pass through said source document and function as character position locator signals, b. a manually operative sensing device responsive to said electromagnetic signals, c. a light sensitive character buffer coupled with said sensing device by cable means including an array of fiber optic light conductors and responsive to signals from the sensing device, d. a character position analysis device coupled with the light sensitive character buffer and responsive to signals therefrom for generating logic control signals and initiating character reading operations, e. character illumination means associated with said sensing device and responsive to a signal initiating character reading operation whereby reflected character representing signals from the source document are sensed by said sensing device, and f. a recognition logic device coupled with the light sensitive character buffer and responsive to reflected data representing signals from the source document are sensed by the sensing device and transmitted to said recognition logic device by way of the light sensitive character buffer and adapted to produce data representing signals as an output therefrom for transmission to other utilization means.

12. An electro-optical system for reading a source document as defined in claim 11 wherein said sensing device includes a signal sensing area a predetermined number of times larger than the type font of the largest character to be sensed on the source document.

* * * * *